United States Patent
Nishiyabu et al.

(10) Patent No.: US 11,781,642 B2
(45) Date of Patent: Oct. 10, 2023

(54) POWER UNIT AND VEHICLE INCLUDING POWER UNIT

(71) Applicant: KAWASAKI MOTORS, LTD., Akashi (JP)

(72) Inventors: Masaki Nishiyabu, Akashi (JP); Satoaki Ichi, Akashi (JP); Kyohei Izumi, Akashi (JP)

(73) Assignee: KAWASAKI MOTORS, LTD., Akashi (JP)

( * ) Notice: Subject to any disclaimer, the term of this patent is extended or adjusted under 35 U.S.C. 154(b) by 21 days.

(21) Appl. No.: 17/457,625

(22) Filed: Dec. 3, 2021

(65) Prior Publication Data

US 2022/0178436 A1  Jun. 9, 2022

(30) Foreign Application Priority Data

Dec. 8, 2020 (JP) .................. 2020-203145

(51) Int. Cl.
 *F16H 57/04* (2010.01)
 *B60K 6/387* (2007.10)
 (Continued)

(52) U.S. Cl.
 CPC ......... *F16H 57/0439* (2013.01); *B60K 6/387* (2013.01); *B60K 6/40* (2013.01);
 (Continued)

(58) Field of Classification Search
 CPC . B60K 6/387; B60K 6/40; B60K 6/48; B60K 2006/4825; B60K 6/485; F16D 25/00; F16H 57/0439; F16H 61/0031
 See application file for complete search history.

(56) References Cited

U.S. PATENT DOCUMENTS

| 8,640,452 B2 | 2/2014 | Schultz et al. |
| 2007/0199316 A1* | 8/2007 | Moorman ................ B60K 6/48 60/430 |

(Continued)

FOREIGN PATENT DOCUMENTS

| DE | 3812412 A * 10/1989 ............... F04C 11/00 |
| DE | 102019100617 A1 * 7/2020 ......... F16H 61/0206 |

(Continued)

OTHER PUBLICATIONS

DE-102019100617-A1 machine translation. (Year: 2020).*

(Continued)

*Primary Examiner* — Kenneth Bomberg
*Assistant Examiner* — Matthew Wiblin
(74) *Attorney, Agent, or Firm* — Alleman Hall Creasman & Tuttle LLP

(57) ABSTRACT

A power unit includes at least one drive source that outputs rotational power to a drive target other than pumps; a first pump rotationally driven by the rotational power of the drive source; a second pump rotationally driven by the rotational power of the drive source, the second pump being different form the first pump; and a power transmission structure that transmits the rotational power of the drive source to the first and second pumps. The power transmission structure includes transmission components and transmits the rotational power to the first pump through one of the transmission components and to the second pump through another of the transmission components.

19 Claims, 7 Drawing Sheets

(51) Int. Cl.
  *B60K 6/40*   (2007.10)
  *B60K 6/48*   (2007.10)
  *B62J 31/00*  (2006.01)
  *B62M 7/02*   (2006.01)
  *F15B 11/08*  (2006.01)
  *F16D 25/00*  (2006.01)

(52) U.S. Cl.
  CPC ............. *B60K 6/48* (2013.01); *B62J 31/00* (2013.01); *B62M 7/02* (2013.01); *F15B 11/08* (2013.01); *F16D 25/00* (2013.01); *B60K 2006/4825* (2013.01); *B60Y 2200/12* (2013.01)

(56)     References Cited

U.S. PATENT DOCUMENTS

| | | |
|---|---|---|
| 2010/0243348 A1 | 9/2010 | Nomura et al. |
| 2013/0213043 A1 | 8/2013 | Kasuya et al. |
| 2014/0060681 A1* | 3/2014 | Hwang ............... F16H 61/0031 137/565.3 |
| 2016/0223070 A1 | 8/2016 | Kito et al. |
| 2017/0058895 A1* | 3/2017 | Schultz ............... F04C 15/0073 |
| 2017/0210315 A1* | 7/2017 | Nakajima ............... F16N 7/385 |
| 2018/0045295 A1* | 2/2018 | Kiyokami ............... B60K 6/445 |
| 2019/0285165 A1* | 9/2019 | Hashimoto ........... B60W 20/10 |
| 2020/0032895 A1* | 1/2020 | Kiyokami ........... F16H 57/0486 |
| 2020/0173341 A1 | 6/2020 | Matsuda |

FOREIGN PATENT DOCUMENTS

| | | |
|---|---|---|
| EP | 2039910 A2 | 3/2009 |
| JP | 2010235056 A | 10/2010 |

OTHER PUBLICATIONS

DE-3812412-A machine translation. (Year: 1989).*
European Patent Office, Extended European Search Report Issued in Application No. 21211401.1, dated May 3, 2022, Germany, 9 pages.

* cited by examiner

POWER UNIT AND VEHICLE INCLUDING POWER UNIT

CROSS-REFERENCE TO RELATED APPLICATION

This application claims priority to and the benefit of Japanese Patent Application No. 2020-203145, filed on Dec. 8, 2020, the entire disclosure of which is incorporated herein by reference.

BACKGROUND OF THE INVENTION

Field of the Invention

The present disclosure relates to a power unit and a vehicle including the power unit.

Description of the Related Art

Japanese Laid-Open Patent Application Publication No. 2010-235056 discloses a vehicle power unit including a drive source for travel and a pump rotationally driven by the drive source. In this power unit, the pump is rotationally driven to lubricate an internal combustion engine.

In the above power unit, the rotational speed of the pump varies depending on the operation state of the drive source, and the pump could be driven unnecessarily. In such a case, the undesired driving of the pump causes extra consumption of the energy of the drive source. This could lead to the loss of energy to be used to drive a drive target other than the pump.

SUMMARY OF THE INVENTION

A power unit according to one aspect of the present disclosure includes: at least one drive source that outputs rotational power to a drive target other than pumps; a first pump rotationally driven by the rotational power of the drive source; a second pump rotationally driven by the rotational power of the drive source, the second pump being different form the first pump; and a power transmission structure that transmits the rotational power of the drive source to the first and second pumps, wherein the power transmission structure includes transmission components and transmits the rotational power to the first pump through one of the transmission components and to the second pump through another of the transmission components.

DESCRIPTION OF THE PREFERRED EMBODIMENTS

Hereinafter, exemplary embodiments will be described with reference to the drawings. The directions mentioned hereinafter are those defined with respect to the operator of a vehicle 11. The drive sources described below are drive sources for travel, unless otherwise specified.

Embodiment 1

Figure 1:
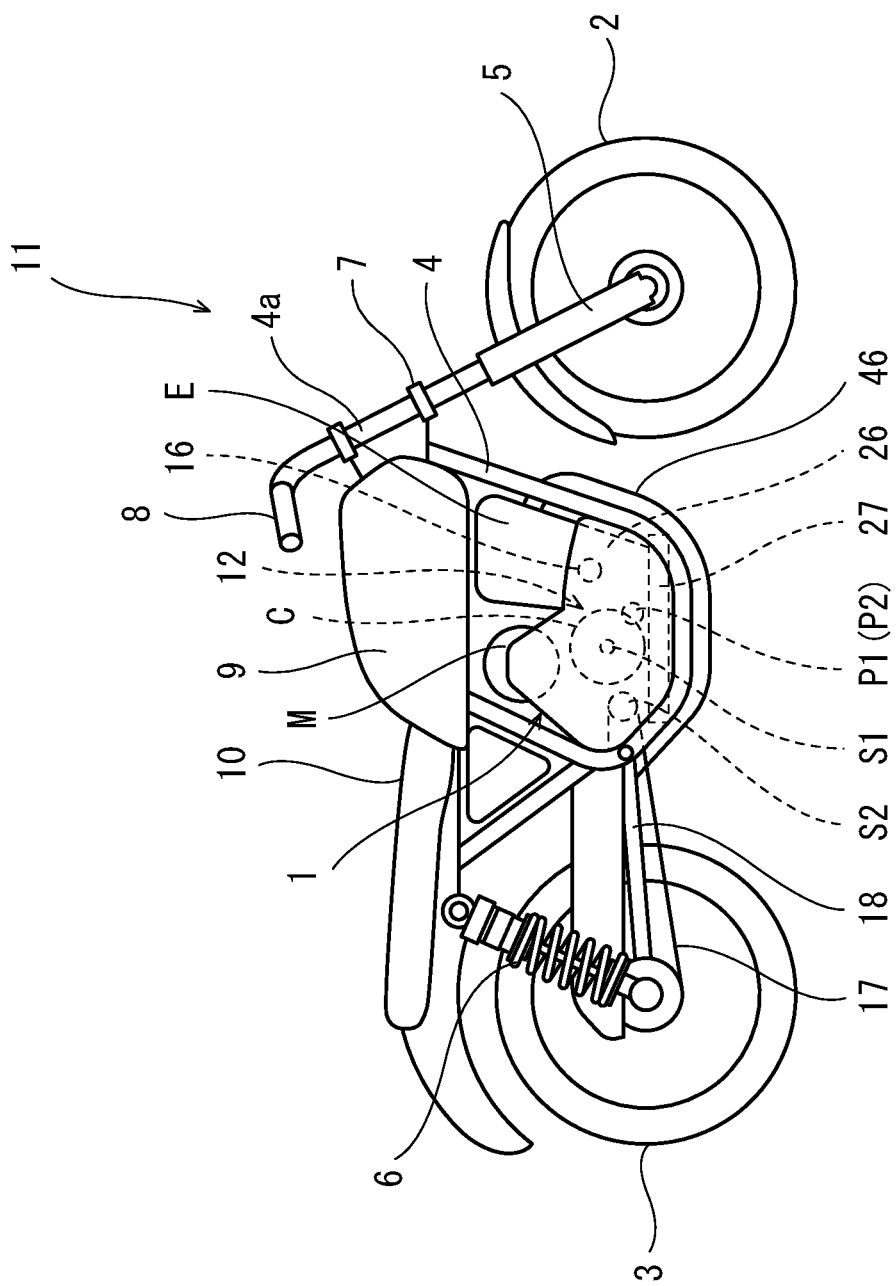
FIG. 1 is a right side view of a vehicle according to Embodiment 1.
Figure 2:
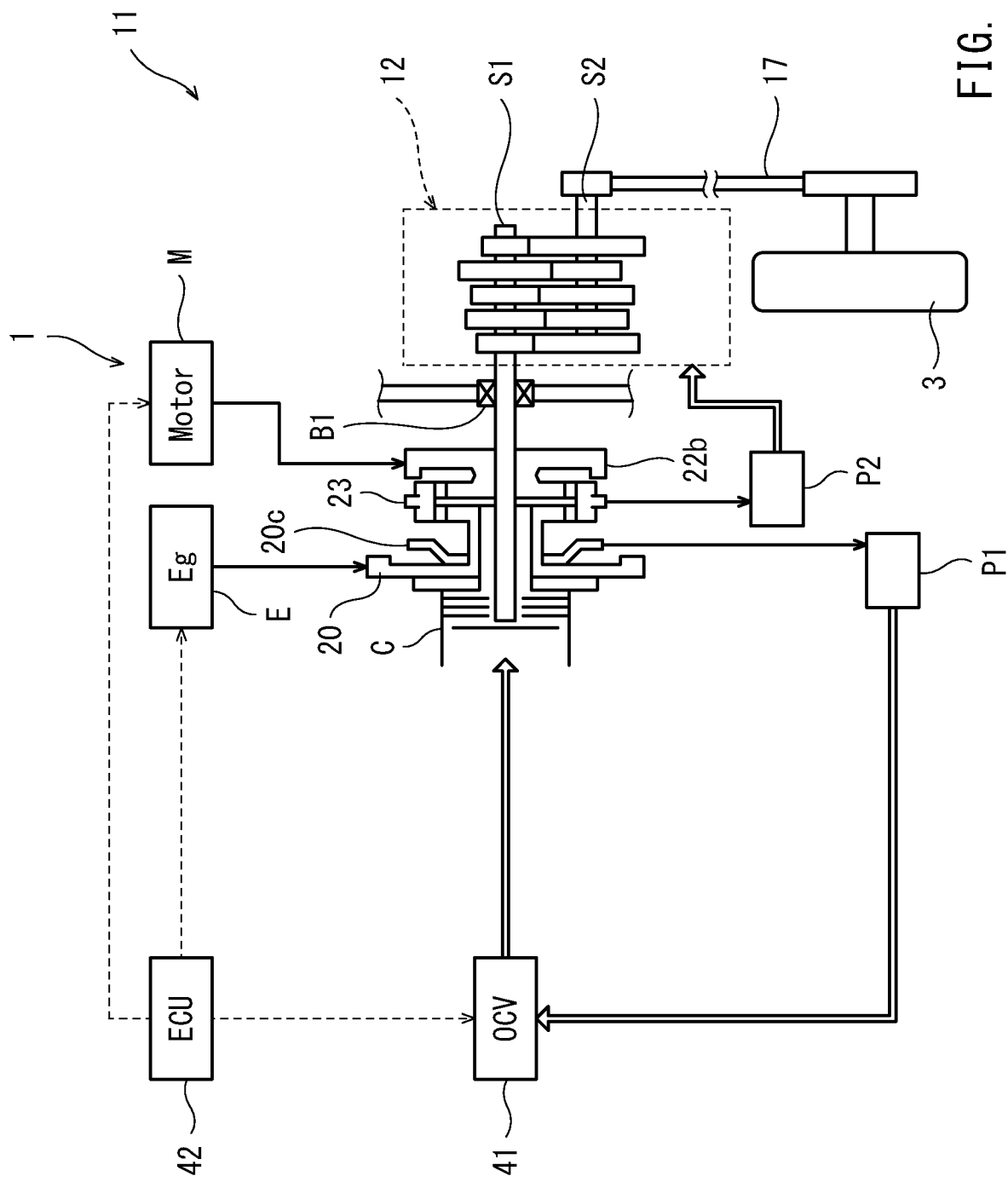
FIG. 2 is a schematic diagram showing an overall power transmission route of the vehicle of FIG. 1.
Figure 3:
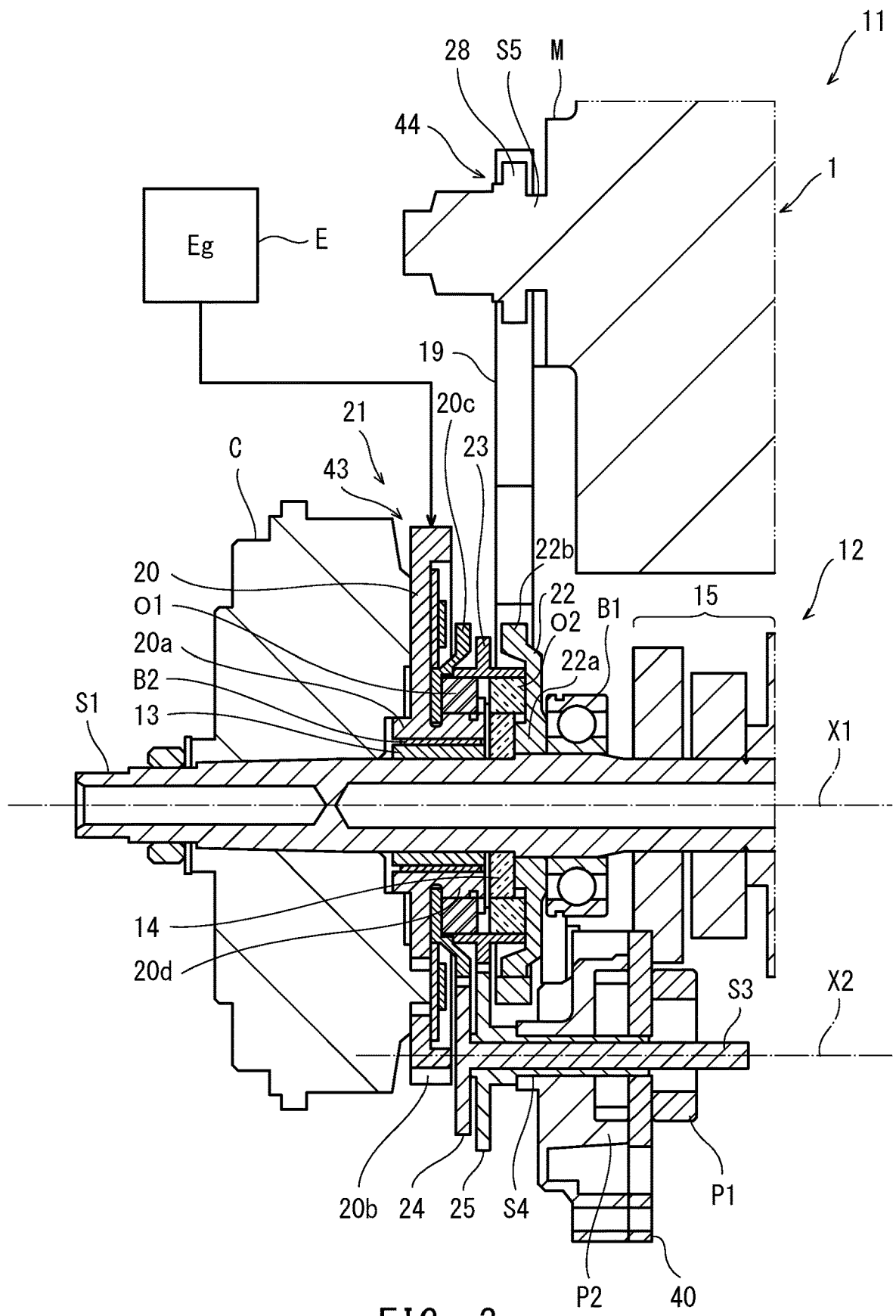
FIG. 3 is a partial schematic diagram of a power system of the vehicle of FIG. 1.

A power unit 1 of the present disclosure can be used in various ways. The power unit 1 of Embodiment 1 is mounted, for example, on a vehicle 11. FIG. 1 is a right side view of the vehicle 11 according to Embodiment 1. FIG. 2 is a schematic diagram showing an overall power transmission route of the vehicle 11 of FIG. 1. FIG. 3 is a partial schematic diagram of a power system of the vehicle 11 of FIG. 1.

The vehicle 11 of the present embodiment is a hybrid vehicle equipped with drive sources for travel. The drive sources include different types of drive sources. For example, the drive sources include two drive sources. In this case, one of the drive sources is an engine (internal combustion engine) E, and the other drive source is an electric motor M. In the present embodiment, the vehicle 11 is a straddle vehicle on which the operator is seated in a straddling position and is, in particular, a motorcycle. The vehicle 11 is configured to allow the operator to select which of the drive sources is used for travel. Specifically, the vehicle 11 is switchable between a first mode where only the electric motor M is used as the drive source for travel and a second mode in which at least the engine E is used as the drive source for travel.

As shown in FIGS. 1 to 3, the vehicle 11 includes a front wheel 2, a rear wheel 3 (drive wheel), a vehicle body frame 4, a front suspension 5 connecting the front wheel 2 to a front portion of the vehicle body frame 4, a rear suspension 6 connecting the rear wheel 3 to a rear portion of the vehicle body frame 4, and a swing arm 18 supporting the rear wheel 3. The front suspension 5 is coupled to a bracket 7 spaced from the front suspension 5 in the up-down direction. To the bracket 7 is connected a steering shaft for steering of the front wheel 2. The steering shaft is supported by a head pipe 4a of the vehicle body frame 4 in such a manner that the steering shaft is angularly movable. To the steering shaft is connected a handle 8 to be gripped by the operator. The swing arm 18 is pivotally supported at one longitudinal end by the vehicle body and rotatably supports the rear wheel 3 at the other longitudinal end. On the vehicle body frame 4 are mounted a fuel tank 9 storing the fuel to be supplied to the engine E and a seat 10 on which the operator sits. One end of an exhaust pipe 46 is connected to a front portion of the engine E. The exhaust pipe 46 extends rearward by passing beneath the engine E.

The vehicle 11 further includes a power unit 1, a transmission 12, a power transmission structure 21, and a switcher. The power unit 1 includes at least one drive source that outputs rotational power to a drive target other than pumps. The at least one drive source is used for travel and, in the present embodiment, includes the engine E and electric motor M. The rotational power of the engine E and the rotational power of the electric motor M are transmitted to the rear wheel 3 through the transmission 12 described later. In the power unit 1 of the present embodiment, the engine E, electric motor M, and transmission 12 are integral with one another. The power unit 1 does not include any electric motor specialized for driving pumps P1 and P2 described later.

The engine E includes: a crankcase 26 in which a crankshaft 16 is located and into which a lubricating fluid is supplied; and a storage pan 27 that stores the lubricating fluid having lubricated components located in the crankcase 26 (the storage pan 27 is an oil pan in the present embodiment). For example, the internal space of the crankcase 26 encloses the transmission 12. The rotational power of the engine E is input to the transmission 12 through a clutch C described later. The transmission 12 is connected to the engine E. The transmission 12 includes an input shaft S1 to which rotational power is input from outside, gear pairs 15 having different reduction ratios, and an output shaft S2 from which the rotational power is output.

The gear pairs 15 change the speed of rotation produced by the rotational power and transmitted from the input shaft S1 to the output shaft S2. The gear pairs 15 are located closer to one axial end of the input shaft S1 than to the other axial end of the input shaft S1. The transmission 12 changes the speed of rotational power-induced rotation by a selected one of the gear pairs 15. The reduction ratio of the transmission 12 is changed by selecting any one of the gear pairs 15. In the transmission 12, the rotational power is transmitted from the input shaft S1 to the output shaft S2 by the meshing gears. The rotational power of the output shaft S2 is transmitted to the rear wheel 3 through a power transmitter 17 included in the vehicle 11. The transmission 12 is shiftable between different reduction ratios even in a neutral state where power transmission from the input shaft S1 to the output shaft S2 is disabled. The transmission 12 of the present embodiment is a dog clutch transmission.

The rotational power of the electric motor M is transmitted to the input shaft S1 without passing through the clutch C. The electric motor M transmits the rotational power to a region downstream of the power shut-off portion of the clutch C in the power transmission routes from the drive sources to the rear wheel 3. Thus, the rotational power of the electric motor M is transmitted to the input shaft S1 regardless of the state of the clutch C. In the vehicle 11, bringing the clutch C into a shut-off state enables production of drive power for travel by the electric motor M alone without causing undesired motion of the movable parts of the engine E.

The power transmission structure 21 transmits the rotational power of each drive source to the input shaft S1. The power transmission structure 21 transmits the rotational power of the drive sources to first and second pumps described later. The power transmission structure 21 includes an engine power transmission structure 43 that transmits the rotational power of the engine E to the input shaft S1 and a motor power transmission structure 44 that transmits the rotational power of the electric motor M to the input shaft S1. The engine power transmission structure 43 includes: a primary gear 20 that receives the rotational power transmitted from the engine E and that rotates about the rotational axis X1 of the input shaft S1; and the clutch C connected to the primary gear 20.

The motor power transmission structure 44 incudes a motor-mounted sprocket gear 28 mounted on the motor shaft S5 of the electric motor M, an input shaft-mounted sprocket gear 22 secured to the input shaft S1, and a power transmitter 19 extending between the gears 22 and 28. The primary gear 20 and input shaft-mounted sprocket gear 22 includes through holes into which the input shaft S1 is insertable. The input shaft S1 is inserted into the through holes of the gears 20 and 22. The rotational axes of the gears 20 and 22 coincide with the rotational axis X1 of the input shaft S1.

The input shaft-mounted sprocket gear 22 is a rotator that rotates together with the input shaft S1, and is rotatably supported by the input shaft S1. The input shaft-mounted sprocket gear 22 includes a tubular portion 22a fitted around the input shaft S1 and a meshing portion 22b extending outward from the tubular portion 22a in the radial direction of the input shaft S1 and meshing with the power transmitter 19. The rotational power of the motor-mounted sprocket gear 28 is transmitted to the meshing portion 22b through the power transmitter 19. Thus, the motor power transmission structure 44 transmits the rotational power of the electric motor M to the rotator secured to the input shaft S1. Additionally, the motor power transmission structure 44 transmits to the electric motor M the rotational power of the rotator secured to the input shaft S1. The electric motor M generates electricity using the transmitted rotational power. In the present embodiment, as described above, rotational power transmission between the input shaft S1 and motor shaft S5 is achieved by the motor power transmission structure 44. Each of the power transmitters 17 and 19 includes, for example, a chain, belt, or drive shaft.

The primary gear 20 is a rotator that rotates relative to the input shaft S1, and is rotatably supported by the input shaft S1. The primary gear 20 transmits the rotational power of the crankshaft 16 to the clutch C. The primary gear 20 of the present embodiment is rotatably supported by the input shaft S1 via a sliding bearing B2. In the present embodiment, a tubular spacer 13 is located between the sliding bearing B2 and input shaft S1.

The primary gear 20 includes a tubular portion 20a, a main gear portion 20b, an auxiliary gear portion 20c, and an extension portion 20d. The tubular portion 20a is tubular and fitted around the input shaft S1. The main gear portion 20b is disc-shaped and extends outward from the tubular portion 20a in the radial direction of the input shaft S1. The gear teeth of the main gear portion 20b mesh with the gear teeth of an output gear mounted on the crankshaft 16. The auxiliary gear portion 20c is disc-shaped and extends outward from the outer circumference of the main gear portion 20b in the radial direction of the input shaft S1. The auxiliary gear portion 20c is opposite the clutch C with respect to the main gear portion 20b and is secured to the lateral face of the main gear portion 20b. The auxiliary gear portion 20c transmits rotational power to a pressure transmission pump-associated gear 24 described later. The extension portion 20d extends outward from the tubular portion 20a in the radial direction of the input shaft S1, is opposite the tubular portion 20a with respect to the auxiliary gear portion 20c, and is secured to the tubular portion 20a. It is sufficient that the tubular portion 20a, main gear portion 20b, auxiliary gear portion 20c, and extension portion 20d be fixed relative to one another, and these portions 20a, 20b, 20c, and 20d may be integral with one another. Alternatively, at least one of the tubular portion 20a, main gear portion 20b, auxiliary gear portion 20c, and extension portion 20d may be separable from the other portions.

The output gear mounted on the crankshaft 16 meshes with the main gear portion 20b, and this meshing enables transmission of the rotational power of the crankshaft 16 to the primary gear 20. As described later, the primary gear 20 meshes with the pressure transmission pump-associated gear 24 via the auxiliary gear portion 20c. This meshing enables transmission of the rotational power of the engine E to a pressure transmission pump P1. Thus, in the power transmission structure 21, the auxiliary gear portion 20c serves as a pressure transmission pump-associated transmission component for transmitting the rotational power of the engine E to the pressure transmission pump P1. Transmission of the rotational power from the primary gear 20 to the pressure transmission pump P1 permits transmission of the rotational power of the engine E to the pressure transmission pump P1 even when the clutch C is in a shut-off state and the rotational power of the engine E is not transmitted to the input shaft S1.

The switcher is shiftable between a connecting state that enables power transmission between one of the drive sources and a drive target other than the pumps and a shut-off state that disables the power transmission between the one of the drive sources and the drive target. The switcher includes, for example, a hydraulic circuit. The switcher of the present embodiment includes the clutch C.

The clutch C is shiftable between a connecting state that enables power transmission between the engine E and the transmission 12 and a shut-off state that disables the power transmission between the engine E and the transmission 12. The clutch C is located closer to the one axial end of the input shaft S1 than to the other axial end of the input shaft S1. A specific example of the clutch C is a pressure-driven clutch. The clutch C includes a tension coil spring. In the natural state where the pressure of a pressure transmission fluid is not applied to the clutch C, the friction plates of the clutch C are not in contact with one another, and the clutch C is kept in the shut-off state that disables power transmission from the one of the drive sources to the drive target. Upon application of the pressure of the pressure transmission fluid to the clutch C, the friction plates move in such a direction as to compress the tension coil spring and come into contact with one another. The friction force acting between the friction plates brings the clutch C into the connecting state that enables power transmission from the one of the drive sources to the drive target. When the clutch C is in the connecting state, the rotational power of the engine E is transmitted to the rear wheel 3 through the output shaft S2. In other words, the engine E transmits the rotational power to a region upstream of the power shut-off portion of the clutch C in the power transmission routes from the drive sources to the rear wheel 3. Thus, when the clutch C is in the shut-off state, transmission of the rotational power of the engine E to the input shaft S1 is blocked. An exiting form of clutch can be used as the clutch C. In the present embodiment, the clutch C is a hydraulically driven multi-plate clutch.

In a specific example, the vehicle 11 further includes: a solenoid valve 41 serving as an oil control valve (OCV) to enable and disable supply of the pressure transmission fluid to the clutch C; and an ECU 42 that controls the solenoid valve 41. During operation of the vehicle 11, the pressure transmission fluid with increased pressure energy is delivered to the solenoid valve 41 by the pressure transmission pump P1. Upon determining that a predetermined connecting condition is satisfied, the ECU 42 controls the solenoid valve 41 to open the solenoid valve 41. As a result, the pressure transmission fluid is supplied to the clutch C, and the friction plates of the clutch C move in such a direction that they are pressed against one another. Thus, the clutch C shifts from the shut-off state to the connecting state. Upon determining that a predetermined shut-off condition is satisfied, the ECU 42 controls the solenoid valve 41 to close the solenoid valve 41. This disables supply of the pressure transmission fluid to the clutch C. In the clutch C, the tension coil spring is released from the compressive force, and the friction plates are separated from one another. Thus, the clutch C returns from the connecting state to the shut-off state.

The vehicle 11 can apply the rotational power of the engine E to the input shaft S1 once the clutch C has been shifted from the shut-off state to the connecting state. In this state, the vehicle 11 can travel by using at least the engine E. When the clutch C is in the connecting state, the vehicle 11 can use both the rotational power of the engine E and the rotational power of the electric motor M as drive power for travel which is applied to the input shaft S1 or can use the rotational power of the engine E as drive power for travel and the rotational power of the electric motor M as power for electricity generation. Additionally, for example, when the clutch C is in the connecting state and the transmission 12 is in the neutral state, the vehicle 11 can use the rotational power of the engine E as power for electricity generation by the electric motor M, rather than as drive power for travel. Thus, in the present embodiment, switching between the power transmission routes from the drive sources can be accomplished by changing the states of the clutch C and the transmission 12.

The primary gear 20 is adjacent to the clutch C. The primary gear 20 is located between the clutch C and the gear pairs 15 in the axial direction of the input shaft S1. More specifically, the input shaft S1 is rotatably supported by bearings B1 supported by the crankcase of the engine E. The bearings B1 are disposed at two locations spaced apart in the direction of the rotational axis X1 of the input shaft S1. The gear pairs 15 are located between the two bearings B1. The input shaft S1 protrudes axially outward with respect to one of the two bearings B1 that is closer to the one axial end of the input shaft S1 than the other bearing B1. The primary gear 20 and clutch C are connected to the protruding portion of the input shaft S1. The input and output shafts S1 and S2 are rotatably supported by the one or more bearings B1 inside the case of the transmission 12.

As shown in FIGS. 2 and 3, the power unit 1 further includes a first pump rotationally driven by the rotational power of the at least one drive source and a second pump rotationally driven by the rotational power of the drive source, the second pump being different from the first pump. The first and second pumps are fluid pumps that allow a fluid to circulate in the power unit 1. The first and second pumps are driven by the rotational power applied from at least the engine E or electric motor M which serves as a drive source for travel.

The first pump of the present embodiment is a pressure transmission pump P1 that supplies a pressure transmission fluid to a pressure transmission target to drive the pressure transmission targets. The pressure transmission target includes a device operated by the pressure energy applied through the pressure transmission fluid. The pressure transmission target of the present embodiment includes the clutch C. The pressure transmission target includes other devices operated to allow the vehicle 11 to travel by the drive power of the engine E. The power transmission structure 21 transmits power of a component to the pressure transmission pump P1, the component being closer to the engine E than a power shut-off point where power transmission is disabled by the clutch C in the shut-off state.

The second pump of the present embodiment is a lubrication pump P2 that supplies a lubricating fluid to a lubrication target to lubricate the lubrication target. The lubricating fluid supplied by the lubrication pump P2 lubricates slidable parts (lubrication target) of the engine E and transmission 12. The lubricating fluid cools heat-generating parts of the engine E that generate heat during operation of the engine E. For example, the lubrication target includes the bearings rotatably supporting the crankshaft 16, input shaft S1, and output shaft S2 and the tooth surfaces of the gear pairs. For example, the heat-generating parts include the cylinder sliding surface and piston of the engine E and the coil of the electric motor M. The lubrication pump P2 sucks in the lubricating fluid stored in the storage pan 27 and pressurizes the lubricating fluid to pump out the lubricating fluid to the lubrication target parts or heat-generating parts. After being supplied to the lubrication target parts, the lubricating fluid flows downward toward the storage pan 27 under its own weight.

The lubricating fluid may be referred to as an engine oil. In the present embodiment, the pressure transmission fluid supplied by the pressure transmission pump P1 and the lubricating fluid supplied by the lubrication pump P2 are embodied by the same engine oil. Thus, the engine oil stored in the storage pan 27 is sucked in by each of the pumps P1 and P2 and supplied by the pump P1 or P2 to the corresponding target.

The power transmission structure 21 further includes a first one-way clutch O1, a second one-way clutch O2, and a common gear 23 to transmit the rotational power from the drive sources to the lubrication pump P2. In the power transmission structure 21, the common gear 23 serves as a lubrication pump P2-associated transmission component for transmitting the rotational power to the lubrication pump P2.

In a specific example, the first one-way clutch O1 is fitted around the outer circumference of the extension portion 20d of the primary gear 20, and the inner ring of the first one-way clutch O1 is secured to the extension portion 20d. The second one-way clutch O2 is fitted around the outer circumference of a tubular spacer 14 secured to the input shaft S1, and the inner ring of the second one-way clutch O2 is secured to the spacer 14. The one-way clutches O1 and O2 are aligned in the direction of the rotational axis X1 and are rotatable relative to each other. In the present embodiment, the spacer 14 and the input shaft-mounted sprocket gear 22 are held in place between the bearing B1 and the primary gear 20. The presence of the spacer 14 between the input shaft S1 and the one-way clutches O1 and O2 makes it easier to properly align the inner circumferences of the inner rings of the one-way clutches O1 and O2.

The common gear 23 is tubular and fitted around the outer circumferences of the two one-way clutches O1 and O2. The common gear 23 has an inner circumferential surface meshing with the outer circumferences of the two one-way clutches O1 and O2. The common gear 23 is an annular gear having an outer circumference on which gear teeth are circumferentially arranged. A lubrication pump-associated gear 25 described later meshes with the gear teeth of the outer circumference of the common gear 23. Thus, each of the one-way clutches O1 and O2 transmits the rotational power received at the inner ring to the lubrication pump P2 through the common gear 23.

Each of the one-way clutches O1 and O2 transmits power from the inner ring to the outer ring when the rotational speed of the inner ring is higher than that of the outer ring. Conversely, when the rotational speed of the outer ring is higher than that of the inner ring, power transmission from the outer ring to the inner ring is blocked. Existing forms of one-way clutches can be used as the one-way clutches O1 and O2. For example, the above functions are achieved by the one-way clutches O1 and O2 each of which includes sprags located between the inner and outer rings. In the power unit 1 of the present embodiment, the auxiliary gear portion 20c and the input shaft-mounted sprocket gear 22 define a space enclosing the one-way clutches O1 and O2.

The first one-way clutch O1 of the present embodiment receives the rotational power of the engine E through the main gear portion 20b of the primary gear 20 and transmits the rotational power to the common gear 23. The second one-way clutch O2 receives rotational power through the input shaft S1 and transmits the rotational power to the common gear 23. The input shaft S1 is rotated not only by power received from the engine E but also by power received from the electric motor M and power received from the rear wheel 3 (drive wheel). Thus, the second one-way clutch O2 transmits any one, or the total of two or more, of the power received from the engine E, the power received from the electric motor M, and the power received from the rear wheel 3 (drive wheel) to the common gear 23.

As described above, the rotational power of the engine E is transmitted to the lubrication pump P2 through the first one-way clutch O1. The rotational power of the input shaft S1 (e.g., the rotational power received from the electric motor M) is also transmitted to the lubrication pump P2 through the second one-way clutch O2. Due to the above-described functions of the one-way clutches O1 and O2, the rotational power of whichever of the primary gear 20 and the input shaft S1 is rotating at a higher speed is transmitted to the lubrication pump P2.

In the power transmission structure 21, as described above, the transmission component that transmits rotational power to the pressure transmission pump P1 (auxiliary gear portion 20c) and the transmission component that transmits rotational power to the lubrication pump P2 (common gear 23) are different. Specifically, these transmission components differ in how to extract the rotational power. In other words, the transmission components differ in the power transmission route through which the rotational power is transmitted to the corresponding pump P1 or P2 and in the state of the power transmitted through the power transmission route. Thus, one of the transmission components is rotatable relative to the other. The peripheral speed of one of the transmission components may be different from the peripheral speed of the other.

The power transmission structure 21 further includes the pressure transmission pump-associated gear 24 that inputs the rotational power of the engine E to the pressure transmission pump P1 and the lubrication pump-associated gear 25 that inputs the rotational power of the engine E and the rotational power of the electric motor M to the lubrication pump P2. The power transmission structure 21 further includes a first input shaft S3 that inputs rotational power of the at least one drive source to the first pump and a second input shaft S4 that inputs rotational power of the drive source to the second pump. The pressure transmission pump-associated gear 24 is coupled to one axial end of the first input shaft S3. The lubrication pump-associated gear 25 is coupled to one axial end of the second input shaft S4.

The pressure transmission pump-associated gear 24 meshes with the auxiliary gear portion 20c. The lubrication pump-associated gear 25 meshes with the common gear 23. The gears 24 and 25 are adjacent to each other. The gears 24 and 25 of the present embodiment are located on the same rotational axis X2. The gears 24 and 25 are rotatable independently of each other. The lubrication pump-associated gear 25 rotates together with the second input shaft S4. The pressure transmission pump-associated gear 24 rotates together with the first input shaft S3. In the power unit 1 of the present embodiment, the auxiliary gear portion 20c is tilted toward the gear teeth of the outer circumference of the common gear 23. This makes it easy to place the gears 24 and 25 close to each other in the direction of the rotational axis X2. It is also easy to place both of the gears 24 and 25 between the primary gear 20 and input shaft-mounted sprocket gear 22.

One of the first and second input shafts S3 and S4 is inserted into the other of the first and second input shafts S3 and S4 and rotatable about the rotational axis X2 relative to the other of the first and second input shafts S3 and S4. In the present embodiment, the one shaft is the first input shaft S3 and the other shaft is the second input shaft S4. Thus, the input shafts S3 and S4 are rotatable relative to each other. The second input shaft S4 is rotatably supported inside the crankcase 26. The first input shaft S3 is rotatably supported by the second input shaft S4. Thus, in the present embodiment, the input shafts S3 and S4 are protected by the crankcase 26. Additionally, placing the input shafts S3 and S4 inside the crankcase 26 makes it easy to ensure the sealing properties of the input shafts S3 and S4. Further, the structure for supporting the first input shaft S3 can be simpler than in the case where a support structure dedicated for the first input shaft S3 is needed.

Figure 4:
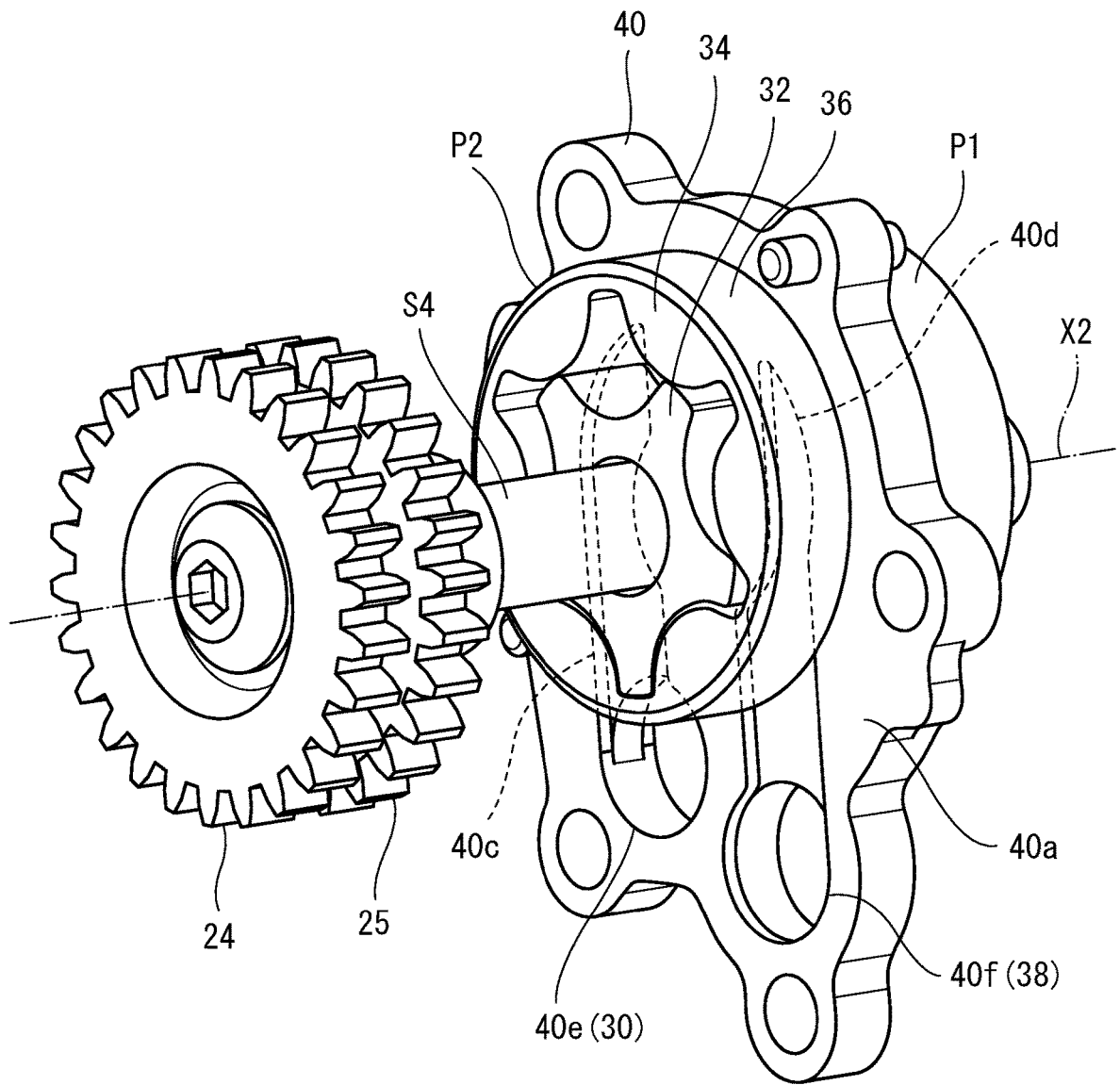
FIG. 4 is a perspective view showing a pressure transmission pump and lubrication pump of FIG. 2 as viewed from the direction of the lubrication pump.
Figure 5:
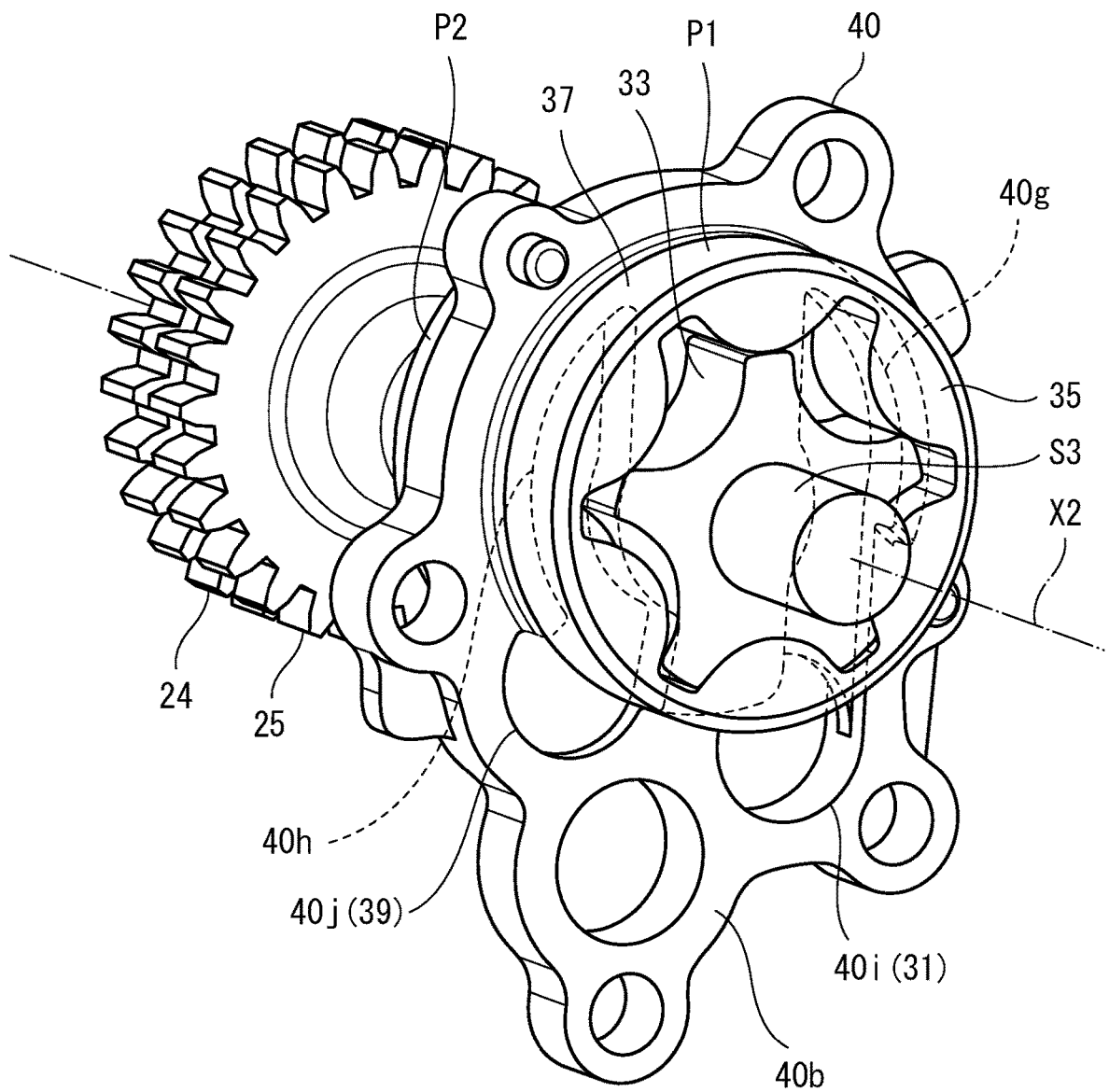
FIG. 5 is a perspective view showing the pressure transmission pump and lubrication pump of FIG. 2 as viewed from the direction of the pressure transmission pump.

FIG. 4 is a perspective view showing the pressure transmission pump P1 and lubrication pump P2 of FIG. 2 as viewed from the direction of the lubrication pump P2. FIG. 5 is a perspective view showing the pressure transmission pump P1 and lubrication pump P2 of FIG. 2 as viewed from the direction of the pressure transmission pump P1. In the present embodiment, as shown in FIGS. 3 to 5, gear pumps are illustrated as examples of the pumps P1 and P2. The pumps P1 and P2 may be, for example, self-sucking pumps.

The lubrication pump P2 includes an inner rotor 32 coupled to the second input shaft S4, an outer rotor 34 combined with the inner rotor 32, and a sleeve 36 covering the outer circumference of the outer rotor 34. The pressure transmission pump P1 includes an inner rotor 33 coupled to the first input shaft S3, an outer rotor 35 combined with the inner rotor 33, and a sleeve 37 covering the outer circumference of the outer rotor 35. The pumps P1 and P2 are driven to rotate about the rotational axis X2.

The other axial end of the first input shaft S3 protrudes out of the other axial end of the second input shaft S4. The pressure transmission pump P1 is secured to that portion of the first input shaft S3 which protrudes out of the second input shaft S4. Thus, in the power unit 1, the gears 24 and 25, pumps P1 and P2, and input shafts S3 and S4 are located on the rotational axis X2. As such, the space required for arrangement of the gears 24 and 25, pumps P1 and P2, and input shafts S3 and S4 can be compact.

The pressure transmission pump-associated gear 24 of the present embodiment is closer to the clutch C than the lubrication pump-associated gear 25. The gears 24 and 25 are opposite the electric motor M across the rotational axis X1. The gears 24 and 25 have different outer diameters and different numbers of teeth. Thus, the pumps P1 and P2 are driven at different rotational speeds. The respective rotational speeds of the pumps P1 and P2 can be set as appropriate. In the present embodiment, when the rotational power of the engine E is transmitted to the gears 24 and 25, the speed change ratios in the transmission routes from the engine E to the gears 24 and 25 are the same. The speed change ratios in the transmission routes from the engine E to the gears 24 and 25 may be different. In this case, for example, the speed increase ratio for the pressure transmission pump P1 may be higher than that for the lubrication pump P2. This allows for reduction in the pressure variation of the pressure transmission fluid supplied by the pressure transmission pump P1 and for quick pressurization of the pressure transmission fluid. Additionally, the smaller speed increase ratio for the lubrication pump P2 can lead to the prevention of excessive lubrication of the lubrication target during low-speed rotation of the engine E and transmission 12.

The rotational axis X2 of the present embodiment is parallel to the rotational axis X1. The pumps P1 and P2 are located closer to that axial end (one axial end) of the input shaft S1 to which the primary gear 20 is connected than to the other axial end of the input shaft S1. Thus, the pumps P1 and P2 are located closer to that axial end of the input shaft S1 on which the clutch C is mounted than to the other axial end. The lubrication pump P2 is closer to the clutch C than the pressure transmission pump P1.

The pumps P1 and P2 are located in the direction opposite the direction in which the power transmitter 19 disposed between the gears 22 and 28 extends from the input shaft-mounted sprocket gear 22 to the motor-mounted sprocket gear 28. Thus, the interference between the power transmitter 19 and the pumps P1 and P2 is prevented. Further, the pumps P1 and P2 are located below the input shaft S1. Thus, the pumps P1 and P2 can be placed in proximity to the storage pan 27.

The pumps P1 and P2 are located in proximity to the portion of the storage pan 27 that is deeper than the rest of the storage pan 27. In other words, in the direction of the rotational axis X1, the pumps P1 and P2 are at a different location than a region through which the exhaust pipe 46 passes beneath the engine E in the front-rear direction. When viewed from the direction of the one axial end of the input shaft S1, at least a part of the pumps P1 and P2 overlaps the clutch C. Thus, in the power unit 1, the space required for arrangement of the pumps P1 and P2 can be compact.

As shown in FIGS. 4 and 5, the lubrication pump P2 includes a fluid inlet 30 through which a fluid is introduced between the inner and outer rotors 32 and 34 and a fluid outlet 38 through which the fluid pressurized between the inner and outer rotors 32 and 34 is discharged. The pressure transmission pump P1 includes a fluid inlet 31 through which a fluid is introduced between the inner and outer rotors 33 and 35 and a fluid outlet 39 through which the fluid pressurized between the inner and outer rotors 33 and 35 is discharged.

In the present embodiment, one of the two fluid inlets 30 and 31 serves also as the other. Thus, the configurations of the pumps P1 and P2 can be simpler than in the case where each of the pumps P1 and P2 includes a different fluid inlet. The power unit 1 of the present embodiment further includes a flow path plate 40 located between the two inner rotors 32 and 33. The flow path plate 40 includes a pair of first and second surfaces 40a and 40b. The first surface 40a includes a first supply path 40c, a first discharge path 40d, a first fluid inlet 40e (fluid inlet 30), and a first fluid outlet 40f (fluid outlet 38). The second surface 40b includes a second supply path 40g, a second discharge path 40h, a second fluid inlet 40i (fluid inlet 31), and a second fluid outlet 40j (fluid outlet 39).

In the flow path plate 40, the upstream ends of the first and second supply paths 40c and 40g in the fluid flow direction communicate with each other in the thickness direction of the flow path plate 40. The same fluid is sucked into the fluid inlets 40e and 40i. That is, in the present embodiment, the pressure transmission fluid and the lubricating fluid are the same. In other words, the pressure transmission fluid serves also as the lubricating fluid.

The two supply paths 40c and 40g and the two discharge paths 40d and 40h are surrounded by the inner rotors 32 and 33 and the outer rotors 34 and 35 in such a manner as to allow the fluid to pass between the inner and outer rotors 32 and 34 and between the inner and outer rotors 33 and rotor 35. The first and second fluid outlets 40f and 40j are spaced from each other along the first and second surfaces 40a and 40b of the flow path plate 40. The first and second fluid outlets 40f and 40j are not in communication, and discharge the fluid toward different external flow paths connected respectively to the outlets 40f and 40j. In the vehicle 11, the space required for arrangement of the fluid flow paths of the pumps P1 and P2 can be compact thanks to the use of the flow path plate 40.

During operation of the pumps P1 and P2, the pumps P1 and P2 are rotationally driven about the same rotational axis X2, and the same fluid is introduced into the pumps P1 and P2 through the same fluid inlet 30 or 31 (40e or 40i). The fluid introduced through the fluid inlet 30 flows through the first supply path 40c and then the first discharge path 40d while being pressurized between the inner and outer rotors 32 and 34, and is discharged through the first fluid outlet 40f and supplied to the lubrication target. The fluid introduced through the fluid inlet 31 flows through the second supply path 40g and then the second discharge path 40h while being pressurized between the inner and outer rotors 33 and 35, and is discharged through the second fluid outlet 40j and supplied to the pressure transmission target.

In the vehicle 11, when the clutch C is in the shut-off state, power transmission from the electric motor M to the rear wheel 3 is prevented from being disturbed due to contact of the power transmission route between the electric motor M and rear wheel 3 with the power transmission route between the engine E at rest and the pressure transmission pump P1. That is, in the vehicle 11, when the clutch C is in the shut-off state where the pressure of the pressure transmission fluid is not applied to the clutch C, power transmission between the engine E and input shaft S1 is disabled. With the engine E at rest, the pressure transmission pump P1 is also at rest; thus, the pressure of the pressure transmission fluid is not applied to the clutch C, and the power transmission route between the engine E and rear wheel 3 is not established. Thus, the vehicle 11 can be operated stably without having to provide the vehicle 11 with an additional fail-safe function for preventing power transmission from the electric motor M to the rear wheel 3 from being disturbed due to contact of the power transmission route between the electric motor M and rear wheel 3 with the power transmission route between the engine E at rest and the pressure transmission pump P1.

As described above, the power unit 1 includes at least one drive source, a first pump, a second pump, and a power transmission structure 21. The power transmission structure 21 includes transmission components and transmits rotational power to the first pump through one of the transmission components and to the second pump through another of the transmission components. The power transmission structure 21 transmits rotational power of the drive source to the first pump through one of the transmission components and to the second pump through another of the transmission components (to the first pump through the auxiliary gear portion 20c and to the second pump through the common gear 23 in the present embodiment).

This makes it easy to apply a suitable level of rotational power to each of the first and second pumps. For example, different levels of rotational power can be transmitted from the drive source to the first and second pumps. Thus, the occurrence of undesired rotation of the first and second pumps can be reduced. The reduction in the occurrence of undesired rotation leads to a reduction in the vibration of the first and second pumps, permitting the first and second pumps to be driven stably. As a result, energy loss arising from undesired pump driving can be reduced.

In the present embodiment, the first pump is the pressure transmission pump P1, and the second pump is the lubrication pump P2. The lubrication pump P2 needs to be operated continuously during operation of the power unit 1. It is generally desirable that the rotational speed of the lubrication pump P2 increase in proportion to the output of the power unit 1. As for the pressure transmission pump P1, it is generally desirable that the pump P1 rotate at a speed sufficient for driving of the pressure transmission target regardless of the output of the power unit 1. Since a suitable level of rotational power is applied to each of the two pumps P1 and P2 differing in the required function, the occurrence of undesired pump driving can be reduced. Thus, the energy loss can be prevented.

The power unit 1 includes drive sources, and the power transmission structure 21 transmits rotational power of one of the drive sources to one of the first and second pumps through the transmission component. Thus, the one of the pumps can be kept at rest while the one of the drive sources is not in operation. This allows for a reduction in the loss arising from driving of the first pump. For example, when the one of the pumps is less frequently operated than the other, the occurrence of undesired pump driving and therefore the energy loss can be reduced.

Specifically, the rotational power of the engine E serving as the one of the drive sources is transmitted to the pressure transmission pump P1 serving as the one of the first and second pumps through the auxiliary gear portion 20c. Thus, the pressure transmission pump P1 cannot be driven by any drive source other than the engine E, in particular by the electric motor M. This can prevent undesired driving of the pressure transmission pump P1 which, unlike the lubrication pump P2, does not need to be driven continuously. As such, energy loss arising from driving of the pressure transmission pump P1 can be prevented.

The one of the first and second pumps is the pressure transmission pump P1, and the pressure transmission target is a switcher shiftable between a connecting state that enables power transmission between the one of the drive sources and a drive target and a shut-off state that disables the power transmission between the one of the drive sources and the drive target. The pressure transmission pump P1 generates pressure energy used as drive power for the switcher.

With the above configuration, the power unit 1 can be constructed in which the transmission route for transmission of the rotational power of the one of the drive sources to the drive target is not established without operation of the one of the drive sources. Thus, undesired transmission of the rotational power of the drive source through the power transmission route can be prevented. Specifically, the pressure transmission pump P1 driven by the engine E serving as the one of the drive sources supplies a pressure transmission fluid to the clutch C shiftable between a connecting state that enables power transmission between the engine E and the transmission 12 and a shut-off state that disables the power transmission between the engine E and the transmission 12. Thus, the clutch C cannot be shifted between the different power transmission states unless the engine E is in operation. As such, unexpected shifting between the different power transmission states can easily be prevented.

The other of the first and second pumps is the lubrication pump P2, and the rotational power of each of the drive sources is transmittable to the lubrication pump 2. Thus, the lubrication pump P2 can be driven by the different drive sources and can be operated more frequently than the one of the pumps.

The use of the lubrication pump P2 as the other of the pumps leads, for example, to an increase in the frequency of lubrication process. This can prevent insufficient supply of the fluid to the slidable parts or heat-generating parts. Thus, the lubrication target can be reliably lubricated with the lubricating fluid. In particular, in the present embodiment, the other of the pumps can be driven by the different drive sources, and the lubrication pump P2 can be driven by any one of the drive sources even in case that the other drive sources are stopped. This can prevent a reduction in the frequency with which the other of the pumps is driven. Further, in the present embodiment, the lubrication pump P2 can be driven by rotation of the input shaft S1 which is induced by a force applied to the rear wheel 3 from the road surface. This can lead to a further increase in the frequency with which the other of the pumps is driven.

For example, the power transmission structure 21 includes the first and second input shafts S3 and S4, and one of the first and second input shafts S3 and S4 is inserted into the other of the first and second input shafts S3 and S4 and rotatable about the rotational axis X2 relative to the other of the first and second input shafts S3 and S4. With this configuration, the input shafts S3 and S4 can easily be arranged in a limited inner space of the power unit 1. For example, the other of the input shafts is supported by a given support structure to allow the other of the input shafts to support the one of the input shafts. In this case, the same support structure can be used to support the input shafts S3 and S4 unlike the case where the input shafts S3 and S4 are disposed at different locations. Thus, the support structure for the input shafts S3 and S4 can be compact.

For example, the gears 24 and 25 of the power transmission structure 21 are located on the same rotational axis X2 and rotatable about the rotational axis X2 independently of each other. Thus, the power transmission routes between the drive sources and the gears 24 and 25 can be converged at one location. Further, the pumps P1 and P2 connected respectively to the gears 24 and 25 can easily be located close to each other.

Additionally, the pumps P1 and P2 receive the same fluid through the same fluid inlet 30 or 31 (40e or 40i) and supply the fluid to respective targets. Thus, unlike the case where the pumps P1 and P2 supply different fluids to the targets, the same storage space storing the fluid and the same route from the storage space can be used for the pumps P1 and P2. As such, the overall configuration of the power unit 1 can be compact.

In the power unit 1 of the present embodiment, the same fluid inlet 30 or 31 (40e or 40i) is located between the two inner rotors 32 and 33 of the pumps P1 and P2. With this arrangement of the fluid inlet 30 or 31 (40e or 40i), the fluid inlet structure of the pumps P1 and P2 can be compact.

The drive sources of the power unit 1 of the present embodiment include the engine E and the electric motor M, and the power transmission structure 21 transmits the rotational power of the engine E and the rotational power of the electric motor M to the lubrication pump P2 and transmits the rotational power of the engine E to the pressure transmission pump P1. With this configuration, the lubrication pump P2, which needs to be driven regardless of which of the drive sources is running, can be kept in operation to lubricate the lubrication target so long as any one of the drive sources is in operation. Thus, insufficient lubrication of the lubrication target can be prevented. As for the pressure transmission pump P1 which need not be driven when the vehicle is traveling by the electric motor M alone, undesired driving of the pressure transmission pump P1 can be prevented during the travel by the electric motor M alone. Thus, the energy loss arising from driving of the pressure transmission pump P1 can be reduced. As such, both prevention of insufficient lubrication of the lubrication target and reduction in energy loss can be achieved.

The power unit 1 includes the transmission 12 connected to the engine E, the pressure transmission target includes the clutch C, and the power transmission structure 21 transmits power of a component to the pressure transmission pump P1, the component being closer to the engine E than a power shut-off point where power transmission is disabled by the clutch C in the shut-off state. Thus, the pressure transmission pump P1 can be driven stably by the rotational power of the engine E regardless of the power transmission state of any components that are closer to the rear wheel 3 than the power shut-off point where power transmission is disabled by the clutch C in the shut-off state.

Figure 6:
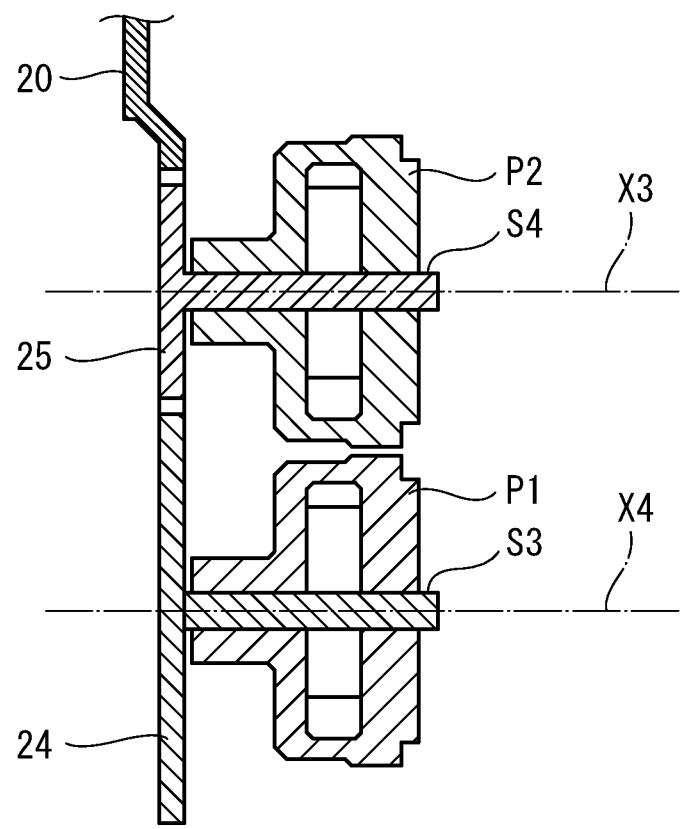
FIG. 6 is a schematic diagram of a pressure transmission pump-associated gear and a lubrication pump-associated gear according to a variant of Embodiment 1.

FIG. 6 is a schematic diagram of the pressure transmission pump-associated gear 24 and lubrication pump-associated gear 25 according to a variant of Embodiment 1. As shown in FIG. 6, the gears 24 and 25 of this variant are arranged with their rotational axes X3 and X4 spaced from each other. The rotational power of the primary gear 20 is transmitted to the lubrication pump-associated gear 25. The rotational power of the lubrication pump-associated gear 25 is transmitted to the pressure transmission pump-associated gear 24 which is spaced from the primary gear 20. Thus, the pumps P1 and P2 are spaced from each other. As described above, the rotational axes of the gears 24 and 25 need not coincide with each other. The rotational axes of the pumps P1 and P2 also need not coincide with each other.

For example, the outer diameters of the gears 24 and 25 may be different in order to allow the gears 24 and 25 to rotate at different rotational speeds. In this variant, for example, the pressure transmission pump-associated gear 24 has a larger outer diameter than the lubrication pump-associated gear 25. Power transmission from the lubrication pump-associated gear 25 to the pressure transmission pump-associated gear 24 may be accomplished through one or more other gears.

The lubricating fluid and the pressure transmission fluid may be different. In this case, in order to prevent mixing of the lubricating fluid and pressure transmission fluid, the power unit 1 may include different flow paths through which the lubricating fluid and the pressure transmission fluid respectively flow or different storage spaces that respectively store the lubricating fluid and the pressure transmission fluid. The pressure transmission target may be any hydraulic actuator driven by the pressure transmission fluid externally supplied, and may be other than the switcher. For example, the pressure transmission target may be a hydraulic shifter included in the transmission or an adjuster that adjusts the operation timing or amount of lift of the intake and exhaust valves of the engine E. The power unit 1 may include one drive source. In this case, the rotational power of the drive source may be input, for example, to the primary gear 20.

The transmission 12 is not limited to a dog clutch transmission. The sliding bearing B2 may be directly mounted on the input shaft S1. The first supply path 40c and first discharge path 40d may communicate with each other. The second supply path 40g and second discharge path 40h may communicate with each other.

Embodiment 2

Figure 7:
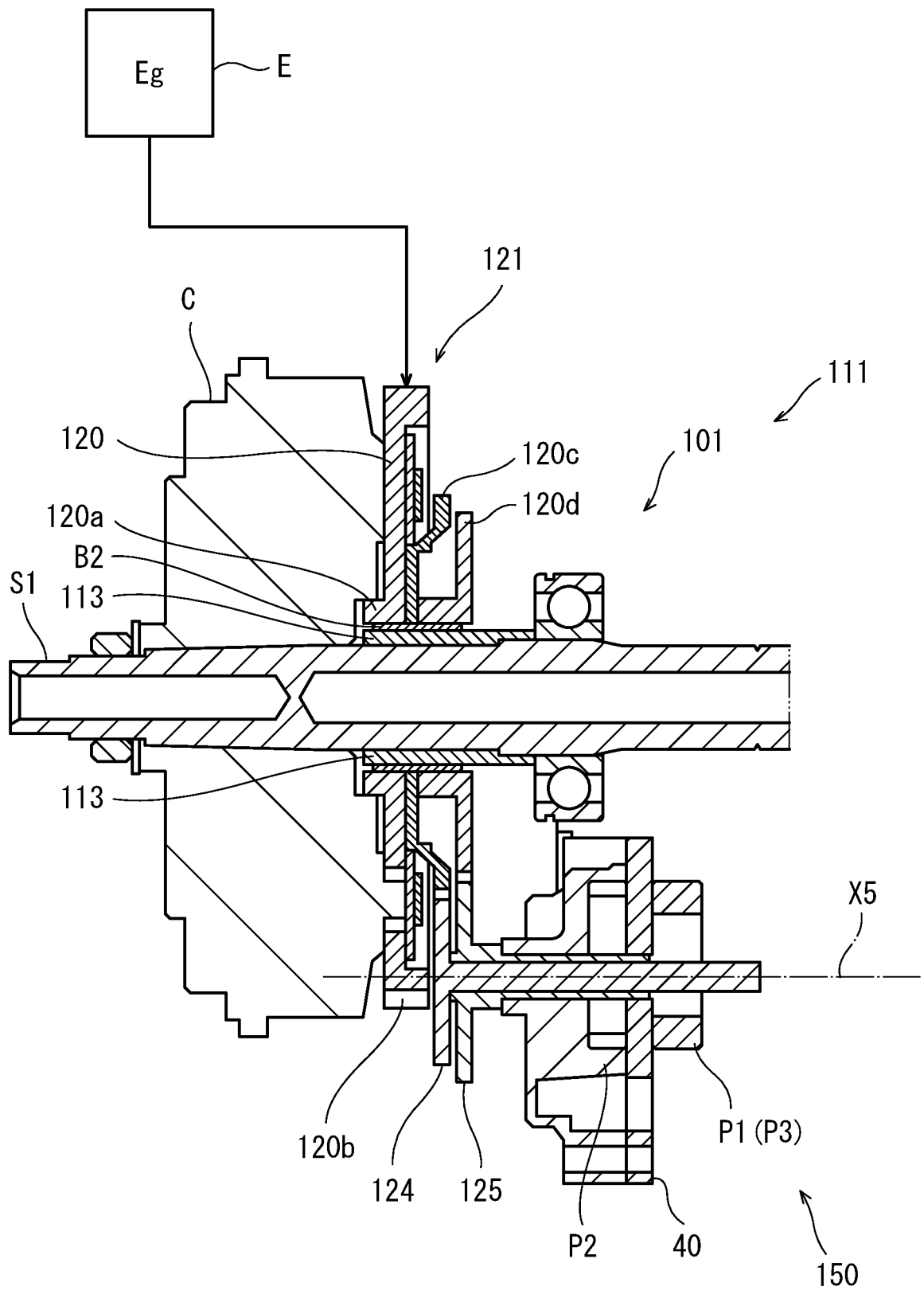
FIG. 7 is a partial schematic diagram of a power system of a vehicle according to Embodiment 2.

FIG. 7 is a partial schematic diagram of a power system of a vehicle 111 according to Embodiment 2. The vehicle 111 includes a power unit 101, which includes one drive source for travel. In the present embodiment, the drive source is the engine E. The drive source may be the electric motor M. As in the vehicle 11, the engine E includes the crankcase 26 and storage pan 27 (see FIG. 1). The power unit 101 further includes first and second pumps. Various pumps that supply fluids to given targets can be selected as the first and second pumps. The first and second pumps of the present embodiment are driven at different rotational speeds. For example, whichever of the first and second pumps is driven at a higher rotational speed has a higher level of output or a lower level of pulsation than the other of the first and second pumps. The first and second pumps have the same form in the present embodiment. However, the first and second pumps are not limited to having this form.

For example, the first pump is driven by the rotational power of the drive source to supply an oil to a first supply target. The second pump is disposed independently of the first pump and driven by the rotational power of the drive source to supply an oil to a second supply target. In the present embodiment, the second pump is driven at a higher rotational speed than the first pump. The first and second pumps are driven independently of each other. The first and second supply targets may be the same or different.

The power unit 101 includes a power transmission structure 121 that transmits the rotational power of the drive source to the first and second pumps. The power transmission structure 121 includes a power transmission gear 120, which includes a tubular portion 120a, a main gear portion 120b, a first auxiliary gear portion 120c, and a second auxiliary gear portion 120d. The first and second auxiliary gear portions 120c and 120d are secured to the lateral face of the main gear portion 120b that is opposite the clutch C, and extend outward in the radical direction of the input shaft S1. In the present embodiment, the first auxiliary gear portion 120c is one transmission component of the power unit 101. The second auxiliary gear portion 120d is a transmission component of the power unit 101 that is other than the first auxiliary gear portion 120c. The tubular portion 120a, main gear portion 120b, first auxiliary gear portion 120c, and second auxiliary gear portion 120d may be integral with one another. Alternatively, at least one of these portions 120a, 120b, 120c, and 120d may be separable from the other portions. In the present embodiment, the clutch C need not be a pressure-driven clutch.

The rotational power of the first auxiliary gear portion 120c is transmitted to a pressure transmission pump-associated gear 124. The rotational power of the second auxiliary gear portion 120d is transmitted to a lubrication pump-associated gear 125. The power transmission gear 120 is rotatably supported by the input shaft S1 via a spacer 113 and the sliding bearing B2. The sliding bearing B2 may be directly mounted on the input shaft S1.

In the present embodiment, the first pump includes a feed pump that supplies a lubricating fluid into the crankcase 26. The first pump is, for example, the lubrication pump P2. The second pump includes at least a scavenge pump (lubrication pump) P3 that supplies the lubricating fluid from the inside of the crankcase 26 to the storage pan 27 or the pressure transmission pump P1 that supplies a pressure transmission fluid to a pressure transmission target. The scavenge pump P3 has a higher fluid supply capacity per unit time than the lubrication pump P2. The scavenge pump P3 has a lower level of pulsation than the lubrication pump P2.

The lubrication pump-associated gear 125 inputs the rotational power of the drive source to the first pump. The pressure transmission pump-associated gear 124 inputs the rotational power of the drive source to the second pump. The pressure transmission pump-associated gear 124 has a smaller number of teeth than the lubrication pump-associated gear 125. Thus, in the case where the same rotational power is transmitted to the gears 124 and 125, the pressure transmission pump-associated gear 124 rotates at a higher speed than the lubrication pump-associated gear 125. The gears 124 and 125 are located on the same rotational axis X5 and rotatable about the rotational axis X5 independently of each other. The rotational power of the drive source is transmitted to each of the gears 124 and 125 through the power transmission gear 120. Thus, the first and second pumps are driven.

In the power unit 101, as described above, the first and second pumps are driven at different rotational speeds. Thus, each of the first and second pumps can be driven at an optimum rotational speed for the operation of the pump. As such, also in the present embodiment, energy loss arising from undesired pump driving can be reduced. Additionally, since the first and second pumps are driven at different rotational speeds, it is easy to allow the first and second pumps to exhibit different capacities while constructing the pumps using the same components. This leads to a reduction in the number of the required components of the first and second pumps.

The first and second pumps of the present embodiment are driven independently of each other. This makes it easy to drive each of the first and second pump at an optimum rotational speed for the operation of the pump. Thus, the energy loss can be further reduced.

For example, the second pump includes at least the scavenge pump P3 that supplies the lubricating fluid from the inside of the crankcase 26 to the storage pan 27 or the pressure transmission pump P1 that actuates a pressure transmission target mounted on the vehicle body, such as the pressure-driven clutch C. Some scavenge pumps are required to have a relatively high fluid supply capacity and are relatively large in size. In the present embodiment, it is possible to reduce the size of the scavenge pump P3 and at the same time drive the scavenge pump P3 at a high rotational speed to supply the required amount of fluid to the target. Thus, the range of choices for the scavenge pump P3 can be expanded, and the flexibility in designing the scavenge pump P3 can be increased. Additionally, in the case where the scavenge pump P3 is driven by the rotational power of the engine E, the pulsation of the pressure transmission fluid due to the rotation of the engine E can be reduced by rotating the scavenge pump at a high speed. Thus, the operation of the pressure transmission target can be stabilized.

In the case where a pressure transmission pump intermittently supplies a pressure transmission fluid to a pressure transmission target, the pressure applied to the pressure transmission target by the pressure transmission fluid could vary due to pulsation of the pressure transmission fluid. In the present embodiment, it is possible to reduce the pulsation of the pressure transmission fluid and stably supply the pressure transmission fluid to the pressure transmission target by driving the pressure transmission pump P1 at a high rotational speed. Thus, even in the case of intermittent supply of the pressure transmission fluid, the operation of the pressure transmission target can be stabilized. In the present embodiment, as described above, not only can the energy loss be reduced, but also the pulsation of the pressure transmission fluid supplied by the pressure transmission pump P1 can be reduced by driving the pressure transmission pump P1 at a high rotational speed, and thus the operation of the pressure transmission target can be stabilized.

For example, the power transmission structure 121 includes the lubrication pump-associated gear 125 and the pressure transmission pump-associated gear 124 having a smaller number of teeth than the lubrication pump-associated gear 125. The gears 124 and 125 are located on the same rotational axis X5 and rotatable about the rotational axis X5 independently of each other. Thus, the gears 124 and 125 can be arranged compactly, and the gears 124 and 125 can be rotated at different speeds to easily drive each of the first and second pumps at a suitable rotational speed for operation of the pump.

The present disclosure is not limited to the above embodiments, and changes, additions, or deletions can be made to the configurations of the above embodiments. As previously stated, in the power unit, the pumps may be driven by two or more drive sources or by one drive source. The power unit may include different types of drive sources or the same type of drive sources.

The vehicle including the power unit is not limited to a motorcycle, and may be any other type of vehicle such as a motor tricycle or four-wheeled vehicle. The power unit may be included in a moving machine other than vehicles. The power unit may be a stationary unit disposed in a given place. The power unit may be used in a stationary device including a drive source that drives a drive target other than pumps. An additional pump such as a water pump may be connected to the input shafts S3 and S4. In the case where the first and second pumps are rotationally driven on the same rotational axis, the additional pump may also be rotationally driven on the same rotational axis.

What is claimed is:

1. A power unit comprising:
   first and second drive sources each of which outputs rotational power to a drive target other than pumps;
   a switcher shiftable between a connecting state that enables power transmission between the first drive source and the drive target and a shut-off state that disables the power transmission between the first drive source and the drive target;
   a first pump rotationally driven by the rotational power of the first drive source;
   a second pump rotationally driven by the rotational power of at least one of the first and second drive sources, the second pump being different from the first pump; and
   a power transmission structure that transmits the rotational power of the first drive source to the first pump and that transmits the rotational power of at least one of the first and second drive sources to the second pump,
   wherein the power transmission structure includes transmission components and transmits the rotational power to the first pump through one of the transmission components and to the second pump through another of the transmission components, and
   wherein the other of the transmission components, which is associated with the second pump, includes:
      a first one-way clutch that receives the rotational power of the first drive source through a route different from a power transmission route which connects the first drive source to the drive target and on which the switcher is located, and
      a second one-way clutch that receives the rotational power of the second drive source.

2. The power unit according to claim 1,
   wherein the first pump is a pressure transmission pump that supplies a pressure transmission fluid to a pressure transmission target to drive the pressure transmission target, and
   wherein the second pump is a lubrication pump that supplies a lubricating fluid to a lubrication target to lubricate the lubrication target.

3. The power unit according to claim 2,
   wherein the first and second drive sources include an engine and an electric motor, and
   wherein the power transmission structure transmits the rotational power of the engine and the rotational power of the electric motor to the lubrication pump and transmits the rotational power of the engine to the pressure transmission pump.

4. The power unit according to claim 3, comprising a transmission connected to the engine,
   wherein the power transmission structure transmits power of a component to the pressure transmission pump, the component being closer to the engine than a power shut-off point where the power transmission is disabled by the switcher in the shut-off state.

5. The power unit according to claim 1, wherein the power transmission structure transmits the rotational power of one of the first and second drive sources to one of the first and second pumps through the respective transmission component.

6. The power unit according to claim 5,
   wherein the one of the first and second pumps is a pressure transmission pump that supplies a pressure transmission fluid to a pressure transmission target to drive the pressure transmission target.

7. The power unit according to claim 3,
   wherein the other of the first and second pumps is a lubrication pump that supplies a lubricating fluid to a lubrication target to lubricate the lubrication target.

8. The power unit according to claim 1,
   wherein the power transmission structure includes
      a first input shaft that inputs the rotational power of the first drive source to the first pump, and
      a second input shaft that inputs the rotational power of the first and second drive sources to the second pump, and
      wherein one of the first and second input shafts is inserted into the other of the first and second input shafts and rotatable about a rotational axis relative to the other of the first and second input shafts.

9. The power unit according to claim 1, wherein the first and second pumps receive the same fluid through a fluid inlet and supply the fluid to respective targets.

10. The power unit according to claim 1, wherein the first and second pumps are driven at different rotational speeds.

11. The power unit according to claim 10, wherein whichever of the first and second pumps is driven at a higher rotational speed has a higher level of output or a lower level of pulsation than the other of the first and second pumps.

12. The power unit according to claim 1, wherein the second pump includes a lubrication flow path through which a lubricating fluid is supplied to a lubrication target portion of the first drive source.

13. The power unit according to claim 1, further comprising a shaft on which the switcher is mounted and to which the rotational power of the first drive source is transmitted,
   wherein the power transmission structure further includes a rotator mounted between the switcher and the second drive source in an axial direction of the shaft, and
   wherein the rotational power is transmitted to each of the first and second pumps through the rotator.

14. The power unit according to claim 1, further comprising:
   a transmission including:
      an input shaft on which the switcher is mounted and to which the rotational power of the first drive source is transmitted, and
      a gear train that changes speed of rotation produced by the rotational power transmitted to the input shaft; and
   a rotator mounted between the switcher and the gear train in an axial direction of the input shaft,
   wherein the rotational power is transmitted to each of the first and second pumps through the rotator.

15. The power unit according to claim 1, further comprising a shaft on which the switcher is mounted and to which the rotational power of the first drive source is transmitted,
   wherein the power transmission structure includes a primary gear mounted between the switcher and the second drive source in an axial direction of the shaft,
   wherein the primary includes a main gear portion and a rotator rotatable together with the main gear portion,
   wherein the first and second one-way clutches are mounted adjacent to the rotator, and
   wherein the rotational power is transmitted to the first pump through the rotator.

16. The power unit according to claim 1, further comprising a shaft on which the switcher is mounted and to which the rotational power of the first drive source is transmitted,
   wherein the power transmission structure further includes first and second rotators that are located on one side with respect to the switcher in an axial direction of the shaft and aligned with each other in the axial direction of the shaft,
   wherein each of the first and second rotators includes gear teeth arranged on an outer circumference of the first or second rotator,
   wherein the rotational power is transmitted to the first pump through the gear teeth of the first rotator, and
   wherein the rotational power is transmitted to the second pump through the gear teeth of the second rotator.

17. The power unit according to claim 16,
   wherein the power transmission structure further includes:
      a gear for the first pump, the gear for the first pump being meshable with the gear teeth of the first rotator to input the rotational power of the first drive source to the first pump, and
      a gear for the second pump, the gear for the second pump being meshable with the gear teeth of the second rotator to input the rotational power of each of the first and second drive sources to the second pump, and
   wherein the gear for the first pump and the gear for the second pump are connected to different shafts each of which drives a corresponding one of the first and second pumps and which are located on the same rotational axis.

18. A vehicle comprising:
   a drive wheel; and
   the power unit according to claim 1,
   wherein each of the first and second drive sources transmits the rotational power to the drive wheel.

19. A power unit comprising:
   first and second drive sources each of which outputs rotational power to a drive target other than pumps;
   a switcher shiftable between a connecting state that enables power transmission between the first drive source and the drive target and a shut-off state that disables the power transmission between the first drive source and the drive target;
   a first pump rotationally driven by the rotational power of the first drive source;
   a second pump rotationally driven by the rotational power of at least one of the first and second drive sources, the second pump being different from the first pump;
   a power transmission structure that transmits the rotational power of the first drive source to the first pump and that transmits the rotational power of at least one of the first and second drive sources to the second pump; and
   a shaft extending in an axial direction,
   wherein the power transmission structure includes first and second rotators that are located on one side with respect to the switcher in the axial direction of the shaft and aligned with each other in the axial direction of the shaft,
   wherein each of the first and second rotators includes gear teeth arranged on an outer circumference of the first or second rotator,
   wherein the second rotator receives the rotational power of the first drive source through a route different from a power transmission route which connects the first drive source to the drive target and on which the switcher is located,
   wherein the rotational power is transmitted to the first pump through the gear teeth of the first rotator, and
   wherein the rotational power is transmitted to the second pump through the gear teeth of the second rotator.

* * * * *